United States Patent [19]  [11] 4,285,419
Anderson  [45] Aug. 25, 1981

[54] BRAKE CLUTCH RELEASE CONTROL FOR BELT DRIVEN RIDING MOWERS

[75] Inventor: Lehman E. Anderson, Ankeny, Iowa

[73] Assignee: AMF Incorporated, White Plains, N.Y.

[21] Appl. No.: 95,888

[22] Filed: Nov. 19, 1979

[51] Int. Cl.³ .............................................. F16D 13/76
[52] U.S. Cl. ........................................ 192/11; 56/11.3
[58] Field of Search ................. 192/12 R, 13 R, 4 A, 192/4 R, 11; 56/11.3; 180/333

[56] References Cited

U.S. PATENT DOCUMENTS

| 2,609,901 | 9/1952 | Rauen | 192/4 A |
| 3,319,731 | 5/1967 | Kenkel | 192/11 X |
| 3,367,459 | 2/1968 | Rubin | 56/11.3 X |
| 3,460,325 | 8/1969 | Musgrave | 192/11 X |
| 3,529,701 | 9/1970 | Gethmann et al. | 192/13 R |
| 3,583,535 | 6/1971 | Plamper | 192/11 |
| 4,058,957 | 11/1977 | Roseberry | 56/11.3 |
| 4,159,613 | 7/1979 | Knudson et al. | 56/11.3 |

Primary Examiner—George H. Krizmanich
Attorney, Agent, or Firm—George W. Price; Walter Lewis

[57] ABSTRACT

In a riding mower having a clutch controlled belt drive and foot brake, linkage between the brake and clutch having lost motion insures that the clutch is disengaged whenever the brake is applied.

2 Claims, 1 Drawing Figure

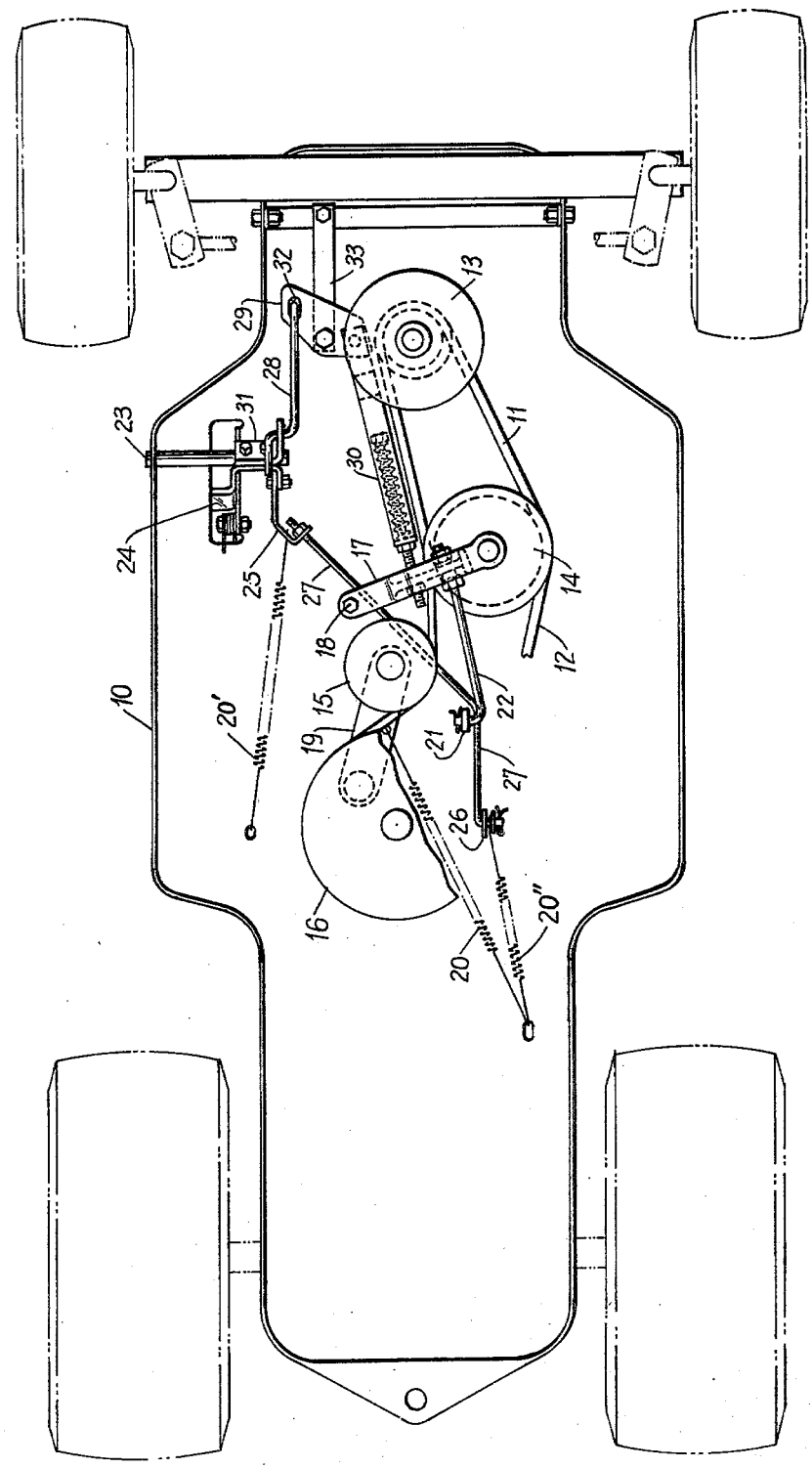

BRAKE CLUTCH RELEASE CONTROL FOR BELT DRIVEN RIDING MOWERS

This invention relates to a brake clutch release control for belt driven riding mowers.

In the instant type belt driven riding mower a clutch hand lever is provided for connecting the drive to the rear wheels transmission and a foot operated brake is provided for applying a caliper type brake to the rear transmission. In normal operation when the rider wishes to stop he first disengages the clutch and then applies the foot brake to bring the mower to an instant stop. However, in a panic situation the rider may forget or not have enough time to first disengage the clutch.

In the instant invention lost motion type linkage means is provided between the brake and clutch so that if the brake is applied without first disengaging the clutch, then the clutch will be automatically disengaged.

The invention will be better understood by considering the appended sheet of drawing taken in connection with the ensuing description. The drawing is a broken away bottom plan view of the type of riding mower referred to, only those parts being illustrated which are necessary for an understanding of the invention.

Briefly, as shown in the drawing, a belt drive is positioned on the bottom side of the bottom frame 10 of the riding mower, which is provided with front and rear wheels, the right hand end of the drawing being the front end of the mower. The belt drive comprises two belts 11 and 12, and four pulleys 13, 14, 15, and 16. Pulley 13 is driven by the not shown engine of the mower, and is connected by belt 11 to pulley 14. Pulley 14 is mounted on an arm 17 which is pivotally mounted to the frame 10 at its upper end as on a stud 18 or the like. Thus, pulley 14 can be swung to the left or right.

The belt 12 interconnects the pulleys 14 and 16 and pulley 15 is a spring biased idler pulley to keep the belt 12 taut. Pulley 15 is mounted on a spring arm 19 and a spring 20 biases the arm 19 down so as to continuously keep the pulley 15 in contact with belt 12. The pulley 16 drives the not shown transmission for the rear wheels of the mower.

The lower end of a pivoted hand clutch lever 21 extends through the frame 10 to below the mower and a link 22 interconnects the clutch lever 21 to the clutch swing arm 17. Thus, when lever 21 is pushed forwardly by the rider its lower end moves rearwardly to pull the link 22 to the left. This causes the pulley 14 to move to the left to pull the belt 11 taut so that the drive is engaged. That is to say, at this point the pulley 13 drives pulley 14 through belt 11, and pulley 14 drives pulley 16 through belt 12 so the rear wheels are driven by the pulley belt drive system 11-16. When the pulley 14 moves to the left the idler pulley 15 takes up any slack introduced in the belt 12. Further movement of the lever 21 in a forward direction causes the belt 11 to move deeper into the pulley 14 so that the speed of the drive at the rear wheels is increased. Thus, the pulley 14 besides being a clutch is also a speed selector. In order to reduce the speed or disengage the clutch the lever 21 is pulled rearwardly to move the pulley 14 to the right. Pulley 14 actually has a pair of grooves for the two belts 11 and 12, or alternately can comprise a pair of pulleys that turn in unison, one for the belt 12, and the other for belt 11 being a vari-pulley.

Also pivotally mounted to the frame 10, on a shaft 23, is a foot brake lever 24. The bottom end of brake lever 24 is U-shaped, and connected to the outer end of the U-shape is a bracket 25. At the rear end of the mower, near the pulley 16, is a pivoted brake applicator lever 26 for applying the not shown rear wheel transmission caliper brake. A bent link 27, interconnects the bracket 25 and lever 26. Thus, when the rider steps down on the not shown foot brake pedal the bracket moves up to pull the link 27 to the right to rock the lower end of lever 26 to the right to apply the brake. The brake is biased to off position by a pair of springs 20' and 20" connected to the bracket and lever 25 and 26 respectively. The links 22 and 27 which are rods have threaded connections at their forward ends with the clutch arm 17 and brake bracket 25 respectively for purposes of making adjustments.

The means for declutching the belt drive when the foot brake is applied, should the rider forget to first operate the clutch lever 21, will now be described. Briefly this means comprises a chain of links 28, 29, and 30 extending from the foot brake 24 to the clutch swing arm 17, with lost motion between the links 28 and 29. Another bracket 31 is connected to the U-shaped part of the brake pedal 24 to move in unison therewith. The link 28 extends from this bracket 31 into an elongated slot 32 in the upper end of link 29. Link 29 is pivoted at its central portion on a strap 33. The lower end of link 29 is interconnected with the central portion of clutch arm 17 by link 30. Link 30 has a threaded connection with clutch arm 17 for adjustment purposes.

By viewing the slot 32 it will be seen that when the clutch is engaged the arm 17 moves to the left and so does the link 30 and the lower end of link 29. This shifts the slot 32 to the right so that the right hand end of link 28 is engaged with the left hand edge of slot 32. Thus, if at this moment the rider stomps on the brake without first releasing the clutch at the clutch hand lever 21, when the pedal 24 moves to apply the brake the bracket 31 will also move to the left to pull the link 28 and the upper end of link 29 to the left. This causes the link 30 and clutch arm 17 to move to the right to disengage the clutch.

If the lever 21 is first moved to disengage the clutch the arm 17 and 30 move to the right. This swings the upper end of link 29 to the left so that the right hand end of link 28 is at the right hand end of the notch 32. So, with the clutch disengaged, when the brake is applied, the bracket 31 and link 28 move but do not affect the clutch because the right hand end of link 28 merely moves in the slot 32 but without causing link 29 to move.

It will now be seen that the invention provides very simple means in a riding mower having a belt drive for ensuring that the drive, or its clutch, is alway disengaged before the brake can be applied. This means comprises a minimum number of parts, such as 28, 29, 30 and lost motion between 28 and 29, and therefore is very straightforward, low cost, and reliable.

I claim:

1. In a belt driven riding lawn mower having solely a hand operated clutch for said belt drive and solely a foot operated brake for braking said mower, the improvement of structure for automatically disengaging said clutch at all speeds of said mower upon operation of said foot brake, said structure comprising linkage means having lost motion interconnecting said foot brake and clutch, said linkage means comprising a chain of three pivotally connected links, one end of said chain being connected to said foot brake and the other end of said chain being connected to said clutch, and said lost motion comprising a slot at the pivotal connection between two of said links.

2. In a belt driven mower as in claim 1, said linkage means being operative solely when said foot brake is operated when said clutch is in engaged position, and said lost motion rendering said linkage inoperative with respect to said clutch when said clutch is in disengaged position.

* * * * *